US005790738A

United States Patent [19]

Parzygnat

[11] Patent Number: 5,790,738
[45] Date of Patent: Aug. 4, 1998

[54] LAMINATED OPTICAL DEVICE ASSEMBLY

[75] Inventor: William Joseph Parzygnat, Morris Township, Morris County, N.J.

[73] Assignee: Lucent Technologies Inc., Murray Hill, N.J.

[21] Appl. No.: 709,942

[22] Filed: Sep. 9, 1996

[51] Int. Cl.⁶ .................................................. G02B 6/36
[52] U.S. Cl. ........................ 385/134; 385/135; 385/147
[58] Field of Search ............................. 385/134, 135, 385/147

[56] References Cited

U.S. PATENT DOCUMENTS

| | | | |
|---|---|---|---|
| 4,266,853 | 5/1981 | Hutchins et al. | 385/135 |
| 4,820,007 | 4/1989 | Ross et al. | 385/135 |
| 4,846,343 | 7/1989 | Rupert | 385/135 X |
| 4,958,903 | 9/1990 | Cobb et al. | 385/135 |
| 5,204,925 | 4/1993 | Bonanni et al. | 385/89 |
| 5,212,761 | 5/1993 | Patrania | 385/135 |
| 5,323,479 | 6/1994 | Allen | 385/135 |
| 5,428,705 | 6/1995 | Hermsen et al. | 385/135 |
| 5,448,675 | 9/1995 | Leone et al. | 385/135 |
| 5,461,693 | 10/1995 | Pimpinella | 385/135 |
| 5,646,775 | 7/1997 | Delrosso et al. | 385/135 X |

FOREIGN PATENT DOCUMENTS

| | | |
|---|---|---|
| 2678076 | 12/1992 | France . |
| 61-062003 | 3/1986 | Japan . |
| 6337318 | 8/1994 | Japan . |
| 9610203 | 4/1996 | WIPO . |

*Primary Examiner*—John D. Lee

[57] ABSTRACT

Disclosed is a laminated optical device assembly having a template which both restrains an optical device and provides a safe bending radius about which to mount fiber optic cables emanating from the device. The assembly is adapted for field assembly to assist a craftsperson with the placement and protection of fragile fiber optic cables. The template is adhesivey bonded between a bottom and a top to provide a robust assembly which is further incorporated into an optical device housing.

18 Claims, 4 Drawing Sheets

LAMINATED OPTICAL DEVICE ASSEMBLY

BACKGROUND OF THE INVENTION

1. Field of the Invention

This invention relates to an optical device assembly, and, in particular, to a laminated assembly having a template which facilitates field assembly.

2. Description of Related Art

Optical fiber distribution frames, such as Lucent Technologies' light guide cross-connect (LGX®) distribution frame serve the function of coupling incoming fiber optic cables to customer equipment. The frame typically includes a multiplicity of shelves, each shelf containing one or more modules whose optical connections are made to the fibers of the incoming cable. The modules contain optical components, such as amplifiers, power dividers, and couplers, which are furnished to a site in wired form with connectors.

One of the problems which exists in the installation or maintenance of the modules is the delicate nature of the component, and, more particularly, the number and small size of the cables leaving the component. The cables are typically 10 mils in diameter, whether they are single or multi-mode. They are easily damaged if they become kinked, and there is a minimum bend radius which should not be passed to avoid damage. These factors make it awkward and difficult to handle and route the fiber optic cables in a field site by a craftsperson, without damaging them.

U.S. Pat. No. 5,204,925, issued to Bonanni et al. discloses an apparatus for the optical interconnection of circuit modules and optical components mounted thereon wherein optical fibers are bonded to a flexible substrate. The apparatus does not provide an element which guides the position of the fibers to avoid kinking, excessive mechanical stress, or even increased transmission loss due to diminished bend radius.

It is desirable, therefore, to assemble these components anywhere in the field into robust modules while protecting their cables from excessive bending stress.

SUMMARY OF THE INVENTION

The present invention relates to a laminated optical device assembly having a template which both restrains an optical device and provides a safe bending radius about which to mount fiber optic cables emanating from the device. The assembly is adapted for field assembly to assist a craftsperson with the placement and protection of fragile fiber optic cables. The template is adhesively bonded between a bottom and a top to provide a robust assembly which is further incorporated into an optical device housing.

In one embodiment of the invention, a first adhesive is supported by the inner surface of the bottom. This adhesive secures the template, the optical component, and the fiber optic cables which are wrapped around at least one rounded surface of the template. An inner surface of the top supports an adhesive layer which is pressed upon the optical device and its cables. The assembly is aided by alignment holes in the bottom, template, and top. Tabs on the bottom may also be bent over the top to complete the assembly.

In another embodiment of the invention, the optical device assembly is mounted within a housing subassembly having an edge which contains restrainers which hold input and output connectors leading from the optical device. A cover module and a connector cover complete the optical device housing which is held together with fastening means.

These and other features and advantages of the invention will be better understood with consideration of the following detailed description of the preferred embodiments taken in conjunction with the accompanying drawings.

The drawings are not to scale.

DETAILED DESCRIPTION OF THE PREFERRED EMBODIMENTS

Figure 1:
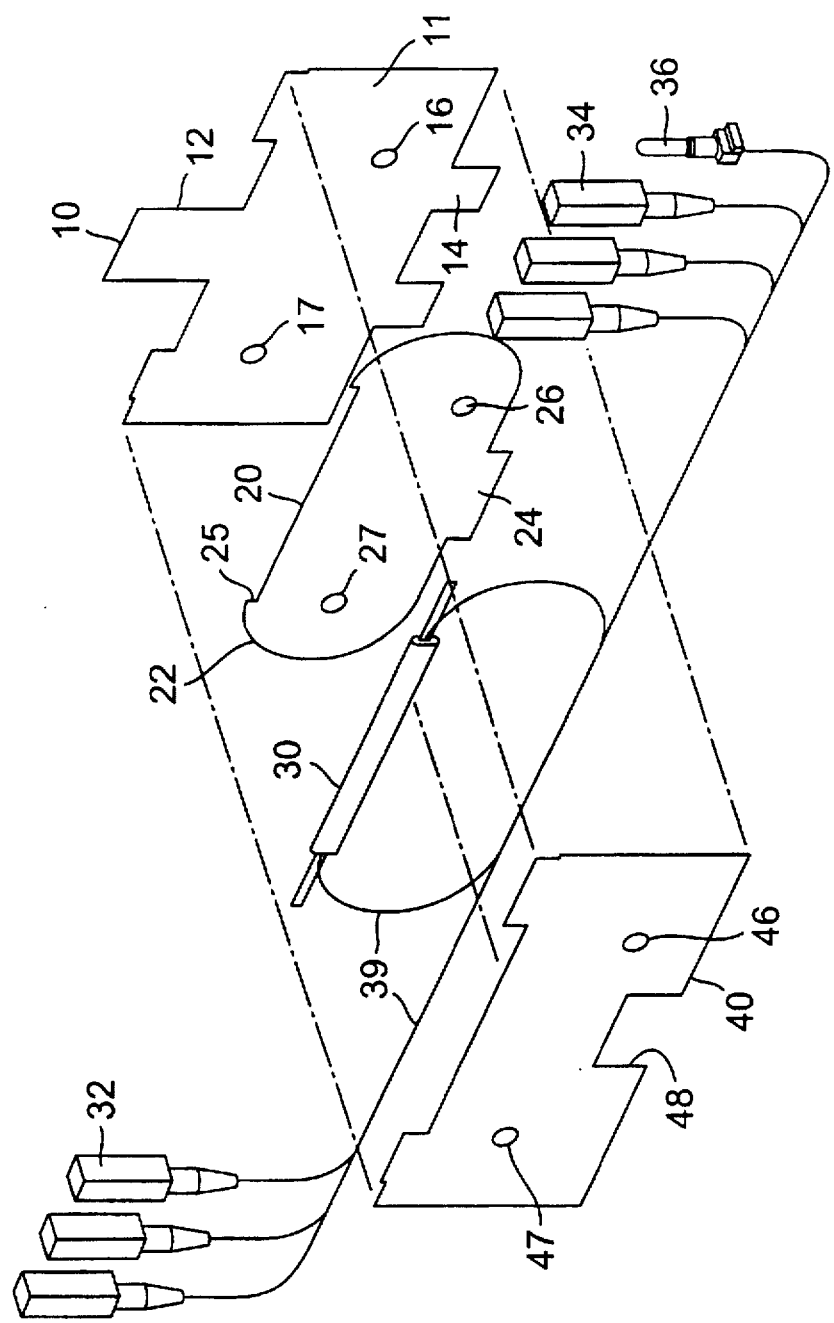
FIG. 1 is an assembly drawing of one embodiment of the invention.

Referring now to FIG. 1, there is shown apparatus 100 in accordance with one embodiment of the invention wherein bottom 10 defines alignment holes 16 and 17. The bottom is die cut from a sheet of material and has an inner surface 11 and tabs 12 and 14, which are shown opposing each other in this embodiment. Template 20 has at least one rounded edge 22, the radius of which equals or exceeds the minimum safe bend radius of fiber optic cables 39. The template also defines alignment holes 26 and 27, as well as notch 25. Optical device 30 is shown as supplied to a site having one or more connector inputs 32 and one or more connector outputs 34 and 36. The outputs need not be of the same configuration. The fiber optic cables emanating from optical device 30 are typically 10 mils in diameter and may be damaged if they are bent around a radius specified by their manufacturer as being small enough to cause excessive, and, therefore, damaging bending stress in the cable. Also, optical loss increases when the bend radius becomes too small. Top 40 defines alignment holes 46 and 47, and notch 48 which provides an exit area for cables emanating from the assembly. Alignment holes 16, 26, and 46 are positioned in the bottom, template, and top, respectively, to cooperate in aligning these elements. Alignment holes 17, 27, and 47 cooperate in a similar fashion.

Figure 2:
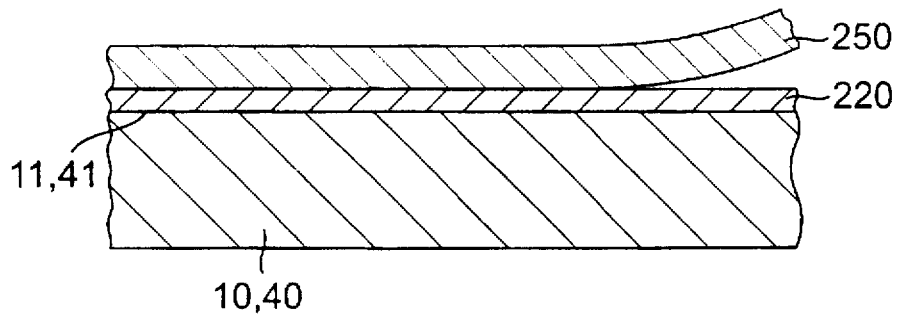
FIG. 2 is a sectional view of the same embodiment.

Referring now to FIG. 2, there is shown a cross-section of either bottom 10 or top 40 according to one embodiment of the invention. Bottom 10 has an inner surface 11 which supports adhesive layer 220, which in turn supports removable cover 250. Inner surface 41 of top 40 also supports adhesive layer 220, which in turn supports removable cover 250. In a preferred embodiment, the adhesive layer is a pressure sensitive adhesive such as Adchem 711®, or equivalent. Removable cover 250 is a release sheet material which is adapted to separate from adhesive layer 220 leaving it on top 40 or bottom 10. The top and bottom are typically die cut from sheet stock which may be a flexible metal or a plastic, and preferably is polyimide, or equivalent which is selected for its property of durability and high temperature service.

To assemble apparatus 100, removable cover 250 is removed from the bottom which is then placed upon an assembly fixture (not shown) supporting at least two alignment pins which are parallel to each other and adapted to be inserted through alignment holes 16 and 17. The placement is such that the adhesive faces away from the assembly fixture. Alignment holes 26 and 27 are located over corresponding holes 16 and 17, respectively, and the template is pressed against the adhesive covering the inner surface of the bottom. Optical device 30 is then set within notch 25 of the template and fiber optic cables 39 are wrapped around one or more edges 22 to ensure that they are not subjected to excessive bending stress. The cables are held in place by the adhesive on the inner surface of the bottom. Alignment holes 46 and 47 are placed over corresponding holes 16 and 17, respectively, and top 40 is pressed against the template and exposed areas of the bottom, thus further securing the optical component and its fiber optic cables. Tab 12 of the bottom is bent over the top securing the optical device 30 in place and one or more tab 14 of the bottom are also bent over the top providing strength relief for the exiting optical cables to complete the assembly of the module. Tab 24 of the template serves to cover the adhesive layer between the template and the bottom when the optical cables exit the assembly.

Figure 3:
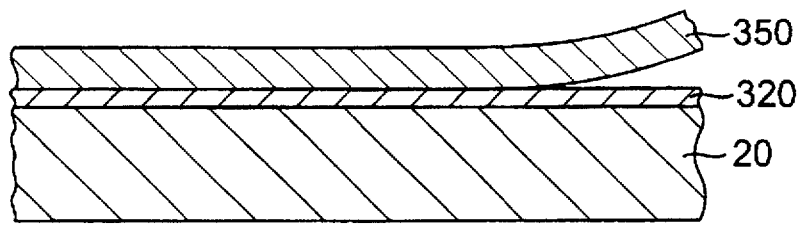
FIG. 3 is a sectional view of another embodiment of the invention.

Referring now to FIG. 3, there is shown another embodiment of the invention wherein the side of template 20 facing the top supports an adhesive layer 320 which is covered by removable cover 350. In this embodiment, the inner surface of the top need not be covered with an adhesive. The assembly begins by removing the adhesive covers and aligning the template over the bottom with the aid of their respective alignment holes. The optical device with its fiber optic cables and the top are placed as previously described and the tabs on the bottom and template are bent over the top.

Figure 4:
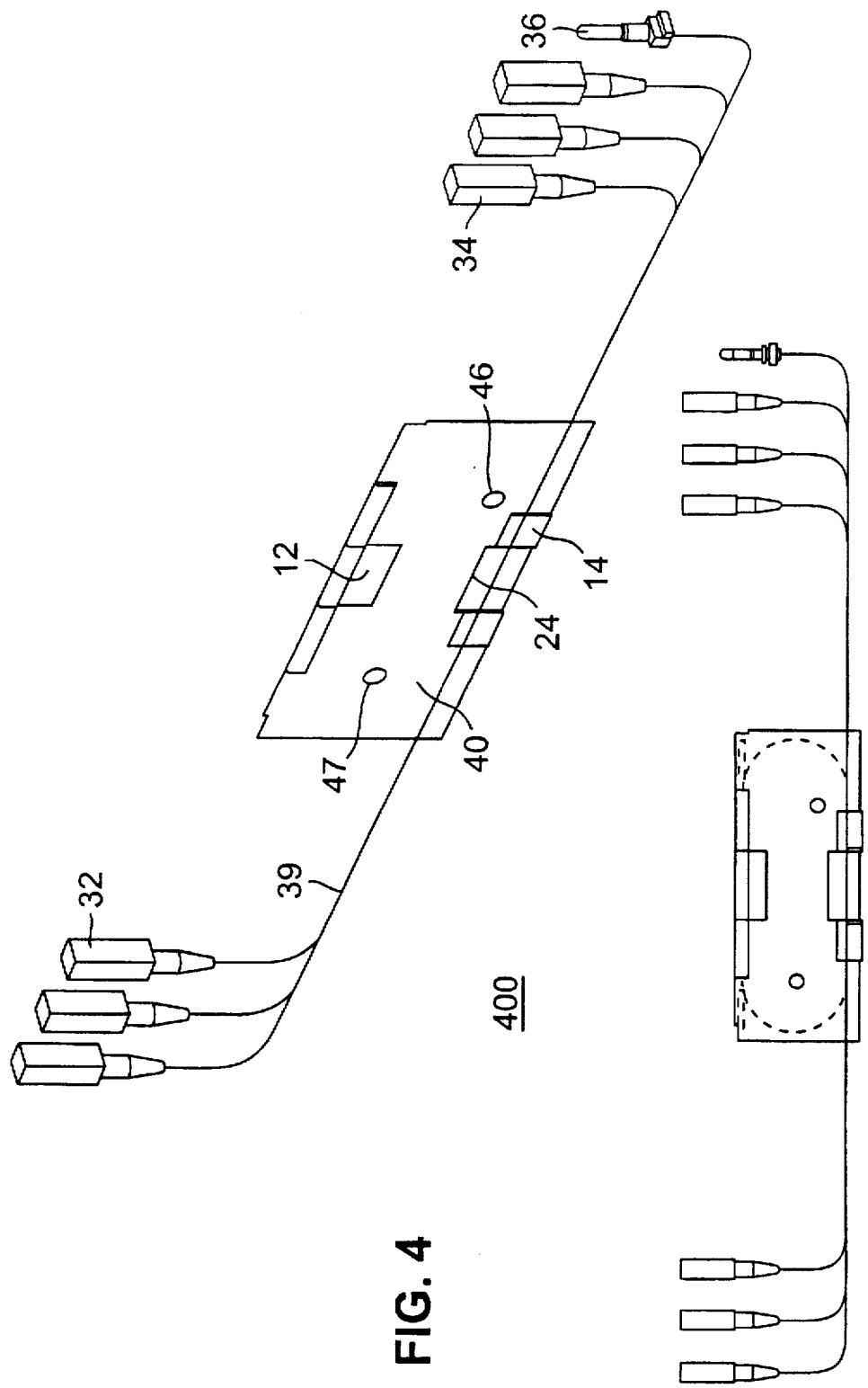
FIG. 4 shows the completed form of the first embodiment of the invention.

Referring now to FIG. 4 there is shown the completed laminated optical device assembly, 400, where the reference numbers describe the same elements as described in FIG. 1.

Figure 5:
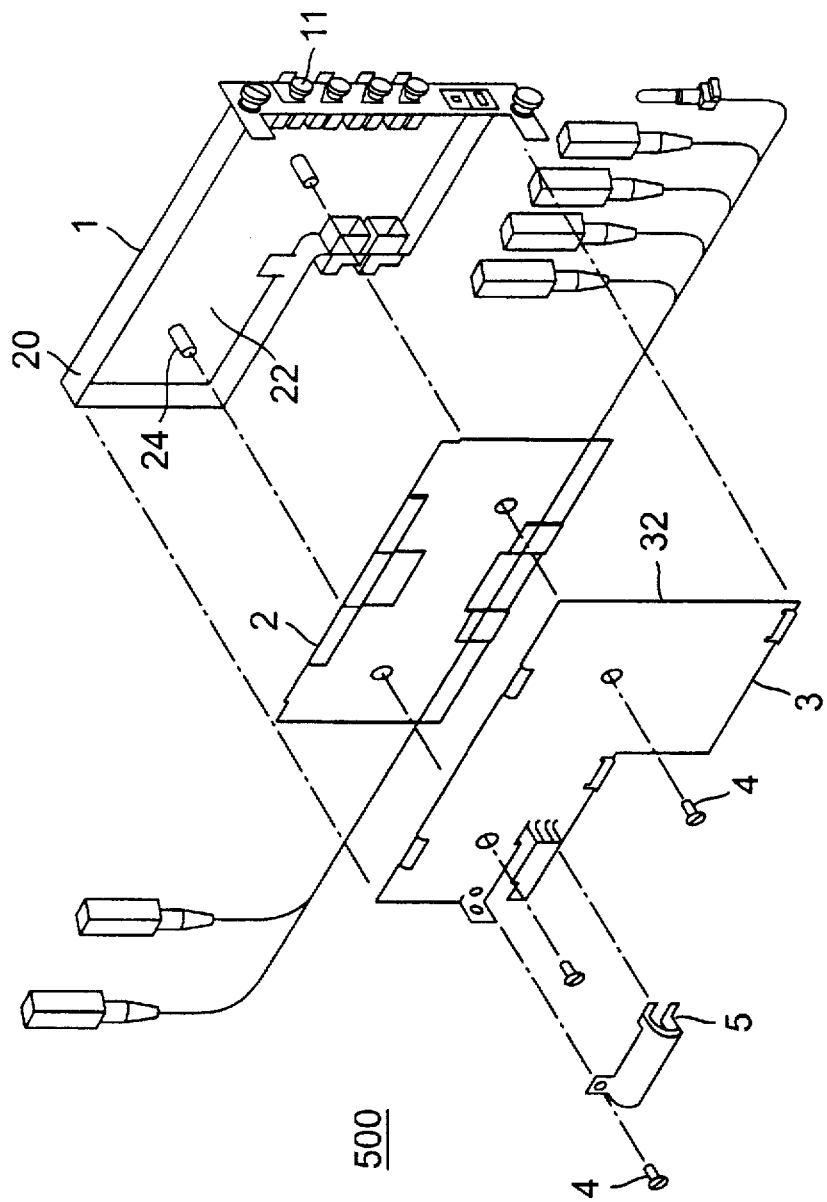
FIG. 5 is a an assembly drawing of a further embodiment of the invention.

Referring now to FIG. 5 there is shown apparatus 500, an optical device housing, comprising housing subassembly 1, comprising a plane 22 and an edge 20 surrounding the plane, laminated optical device assembly 2 (apparatus 400), cover module 3 defining a series of holes which accommodate fastening means 4 and connector cover 5. The holes in the cover module cooperate with alignment holes 46 and 47 in apparatus 400 to secure said apparatus to the housing subassembly, and the cover module to the same, with the aid of fastening means 4. Perimeter 32 of the cover module has the same outline as edge 20. Preferably the fastening means are screws adapted to thread into means for fastening 24 in the housing subassembly, but they may also be rivets, clips, or the like which are well known in the fastening art. The connector cover is also attached to the cover module by fastening means 4. The connector cover serves to protect fiber optic cables 36 of apparatus 400. The housing subassembly also serves to support one or more retainers 11 which are adapted to hold the inputs and outputs of apparatus 400.

Changes and modifications in the specifically described embodiments can be carried out without departing from the scope of the invention. In particular, the relative locations of inputs and outputs may be reversed and the locations of the adhesive layers may be allocated between the top, template, and bottom such that there is always an adhesive layer between the bottom and the template, and between the template and the top, after assembly. The adhesive layers may also be applied to the bottom, template, or top by spraying or a brushing operation at the field site.

I claim:

1. A laminated optical device assembly comprising:

a bottom sheet, having an inner surface and at least one tab, defining at least two alignment holes;

a template, having at least one rounded edge specified by a radius, defining at least two alignment holes; and a top sheet defining at least two alignment holes;

wherein the alignment holes defined by the bottom sheet, template and top sheet are located to cooperate in the placement of the bottom sheet, template, and top sheet as the alignment holes are placed over at least two alignment pins.

2. The laminated optical device assembly of claim 1 wherein the tab is adapted to fold over the template and the top sheet after the bottom sheet, template, and top sheet have been aligned.

3. The laminated optical device assembly of claim 1 further comprising a first adhesive located between the bottom sheet and the template.

4. The laminated optical device assembly of claim 3 further comprising an optical device having fiber optic cables emanating therefrom, said cables having a minimum safe bending radius which is less than or equal to the radius of the rounded edge of the template.

5. The laminated optical device assembly of claim 4 wherein the first adhesive is adapted to restrain the optical device and the fiber optic cables.

6. The laminated optical device assembly of claim 5 further comprising a second adhesive located between the template and the top sheet.

7. The laminated optical device assembly of claim 1 wherein the top sheet defines a notch which is adapted to accommodate the exit of fiber optic cables from the assembly.

8. The laminated optical device assembly of claim 1 wherein the inner surface of the bottom sheet supports a first adhesive layer adapted to restrain an optical device having fiber optic cables emanating therefrom.

9. The laminated optical device assembly of claim 1 wherein an inner surface of the top sheet supports a second adhesive layer adapted to restrain an optical device having fiber optic cables emanating therefrom.

10. The laminated optical device assembly of claim 8 wherein the first adhesive layer is a pressure sensitive adhesive.

11. The laminated optical device assembly of claim 9 wherein the second adhesive layer is a pressure sensitive adhesive.

12. The laminated optical device assembly of claim 1 wherein the template has at least one tab adapted to provide an exit for a protected length of fiber optic cable.

13. The laminated optical device assembly of claim 1 further comprising an optical device having fiber optic cables emanating therefrom, wherein the tab is adapted to fold over the template and the top sheet after the bottom sheet, template, and top sheet have been aligned, and wherein the tab secures the optical device in place.

14. The laminated optical device assembly of claim 1 further comprising an optical device having fiber optic cables emanating therefrom, wherein the tab is adapted to fold over the template and the top sheet after the bottom sheet, template, and top sheet have been aligned, and wherein the tab provides strength relief for the fiber optic cables emanating therefrom.

15. A laminated optical device assembly comprising:

a bottom sheet, having an inner surface and at least one tab, defining at least two alignment holes, the inner surface supporting a first adhesive;

a template, having at least one edge specified by a radius, defining at least two alignment holes;

an optical device having fiber optic cables emanating therefrom, said cables having a minimum safe bending radius which is less than or equal to the radius of a rounded edge of the template; and a top sheet, having an inner surface and at least one notch, defining at least two alignment holes, the inner surface supporting a second adhesive;

wherein the alignment holes defined by the bottom sheet, template and top sheet are located to cooperate in the placement of the bottom sheet, template, and top sheet as the alignment holes are placed over at least two alignment pins, the first adhesive is adapted to restrain the optical device and the fiber optic cables, and the top sheet defines a notch which is adapted to accommodate fiber optic cables emanating from the assembly.

16. An optical device housing comprising:

a housing subassembly, having a plane and an edge surrounding the plane, the plane supporting means for fastening and the edge supporting at least one retainer adapted to secure a fiber optic connector;

a cover module, defining at least one hole adapted to accommodate fastening means, a perimeter of said module having the same outline as the edge of the housing subassembly; and a connector cover adapted to mount upon the cover module;

wherein the hole in the cover module is located to align with the fastening means in the housing subassembly.

17. The optical device housing of claim 16 further comprising an optical device assembly, defining at least one hole, having at least one fiber optic cable emanating therefrom which is terminated by a fiber optic connector, said assembly adapted to fit within the edge of the housing subassembly, and said fiber optic connector being adapted to fit within the retainer.

18. The optical device housing of claim 16 further comprising means for fastening adapted to penetrate the hole in the cover module and connect to means for fastening supported by the housing subassembly.

* * * * *